United States Patent

Bravo

[11] Patent Number: 6,105,452
[45] Date of Patent: Aug. 22, 2000

[54] LOCKING DEVICE FOR A SELECTOR LEVER

[75] Inventor: Ernesto Bravo, Cambiano, Italy

[73] Assignee: Dr. Ing. h.c.f. Porsche AG, Weissach, Germany

[21] Appl. No.: 08/829,287

[22] Filed: Mar. 31, 1997

[30] Foreign Application Priority Data

Mar. 29, 1996 [IT] Italy .................................. TO96A0249

[51] Int. Cl.⁷ ................................................. B60K 20/00
[52] U.S. Cl. ..................................... 74/473.18; 74/473.25
[58] Field of Search ........................... 74/473.18, 473.25, 74/473.24

[56] References Cited

U.S. PATENT DOCUMENTS

| | | | |
|---|---|---|---|
| 4,326,432 | 4/1982 | Miller | 74/475 |
| 5,044,220 | 9/1991 | Raff et al. | 74/473 R |
| 5,062,314 | 11/1991 | Maier et al. | 74/475 |
| 5,622,079 | 4/1997 | Woeste et al. | 74/335 |
| 5,689,996 | 11/1997 | Ersoy | 74/335 |

FOREIGN PATENT DOCUMENTS

| | | |
|---|---|---|
| 0413116A1 | 2/1991 | Germany . |
| 0575658A1 | 12/1993 | Germany . |

OTHER PUBLICATIONS

European Search Report dated Sep. 29, 1998.

*Primary Examiner*—Charles A. Marmor
*Assistant Examiner*—David Fenstermacher
*Attorney, Agent, or Firm*—Evenson McKeown Edwards & Lenahan, PLLC

[57] ABSTRACT

A locking assembly for a selector lever of an automatic gearbox. A the locking device acts upon a transmission member situated between the selector lever and the automatic gearbox. The selector lever is connected in a first gear-shift gate to the transmission member, and the locking device then acts upon the transmission member and secures it in its current position when the selector lever has left the first gear-shift gate and is no longer connected to the transmission member. In addition, a longitudinal locking assembly, which holds the selector lever in pre-set positions during its longitudinal movement in the first gear shift gate, is provided for the selector lever. In order to provide a locking device which is inexpensive in design and simple to assemble, it is proposed that the locking device and the longitudinal locking assembly interact with each other when the selector lever is in the first gear-shift gate, In this way, the locking device is now unlocked by way of the longitudinal locking assembly, so that the transmission device for the automatic gearbox is released only when the selector lever is moved.

12 Claims, 4 Drawing Sheets

LOCKING DEVICE FOR A SELECTOR LEVER

BACKGROUND AND SUMMARY OF THE INVENTION

This application claims the priority of Italian application TO 96 A 000249 filed Mar. 29, 1996 in Italy, The invention relates to a locking device for a selector lever for an automatic gearbox.

A locking device preamble is already known from European Patent EP O 413 116 B1. The selection device disclosed there for an automatic gearbox has a selector lever which can be pivoted in two gear-shift gates. When the selector lever is in the first gear-shift gate, it acts directly upon the automatic gearbox by means of a transmission device. When the selector lever is shifted into the second gear-shift gate, it is detached from the transmission device and a locking device prevents the transmission device from being moved out of the intended position in an undesired manner. The locking device comprises a locking member which is mounted on the transmission device and which is pivotable into an opening arranged stationary with the housing. The locking member is actuated by the pivoting movement of the selector lever from the first gear-shift gate into the second gear-shift gate and is disengaged again by a reverse pivoting movement from the second gear-shift into the first gear-shift gate.

In addition, a longitudinal locking means on the selection device is likewise known from this EP O 413 116 B1 document, in which the longitudinal locking means is effective in the first gear-shift gate during the longitudinal pivoting of the selector lever. With the aid of this longitudinal locking means the longitudinal movement of the selector lever is restricted to specific positions provided in the first gear-shift gate and the selector lever is held in pre-set positions in the first gear-shift gate. The longitudinal locking means comprises a slide which is arranged on the selector lever and which is movable radially to the pivoting movement thereof. A projecting pin, which engages in an indentation in the housing, is mounted on the slide. An actuating device extends from the slide to a button which is arranged at the upper end of the selector lever and which can be pressed by the driver in order to unlock the longitudinal locking means. In this case the slide is moved out of its spring-loaded rest position and the pin is disengaged from the indentation, so that the selector lever is freely pivotable.

In contrast, an object of the invention is to provide a locking device which is inexpensive in design and simple to assemble.

This object is attained by providing an assembly wherein a locking device for the selector lever and a locking assembly holding the selector lever in respective shifting positions when operating in a transmission shifting gate have the same actuating direction. For this purpose it is provided that the locking device and the longitudinal locking assembly interact with each other when the selector lever is in the first gear shift gate. In this case the operational reliability of the locking device is increased in an advantageous manner since the locking device is now unlocked by way of the longitudinal locking assembly so that the transmission device for the automatic gearbox is released only when the selector lever is moved. The movements of the locking device and the longitudinal locking assembly are now linked together by the reciprocal action.

Advantageous features of preferred embodiments of the invention are set out below.

In certain preferred embodiments it is proposed that the locking device and the longitudinal locking assembly are actuated jointly. An unlocking of the selector lever performed consciously by the driver thus leads to the direct release of both the locking device and the longitudinal locking assembly, so that undetermined intermediate states are avoided.

Alternatively, it is proposed according to certain preferred embodiments that the longitudinal locking assembly actuates the locking device. On the one hand this can be carried out in that the longitudinal locking assembly acts upon the locking device, and the longitudinal locking assembly and the locking device are thus jointly unlocked. Alternatively, it is possible for the longitudinal locking assembly to unlock the locking device when the longitudinal locking assembly enters its position provided in the first gear-shift gate. By releasing the locking device, the transmission device is then released at the moment at which the longitudinal locking assembly becomes effective again after the selector lever is pivoted back into the first gear-shift gate. These embodiments have in common the advantage of reliably preventing an uncontrolled movement of the transmission device at all times on the one hand and at the same time of ensuring the reliable unlocking of the locking device and the longitudinal locking assembly on the other hand.

As additionally proposed in certain preferred embodiments, the locking device and the longitudinal locking assembly can have a common matching member. This results in a reduced manufacturing outlay, and in addition the locking device and the longitudinal locking assembly need not be separately adapted to each other in their position.

In a preferred embodiment the locking device is constructed in the form of a radial slide which engages in an indented profile arranged on the housing. The longitudinal locking assembly likewise constructed in the form of a slide has a projection which engages in the same indented profile in the housing. In accordance with a first embodiment, as the selector lever is pivoted into the first gear-shift gate the projection pushes the radial slide out of the indented profile and thus disengages the locking device. In the case of a second, alternative embodiment, both the radial slide and the projection remain in engagement with the indented profile when the selector lever is pivoted into the first gear-shift gate. The radial slide has en entrapment member provided therewith which cooperates with the projection and transmits the movements of the slide of the longitudinal locking assembly to the radial slide and thus the locking device so that the longitudinal locking means and the locking device are unlocked jointly.

Other objects, advantages and novel features of the present invention will become apparent from the following detailed description of the invention when considered in conjunction with the accompanying drawings.

DETAILED DESCRIPTION OF THE DRAWINGS

Figure 1:
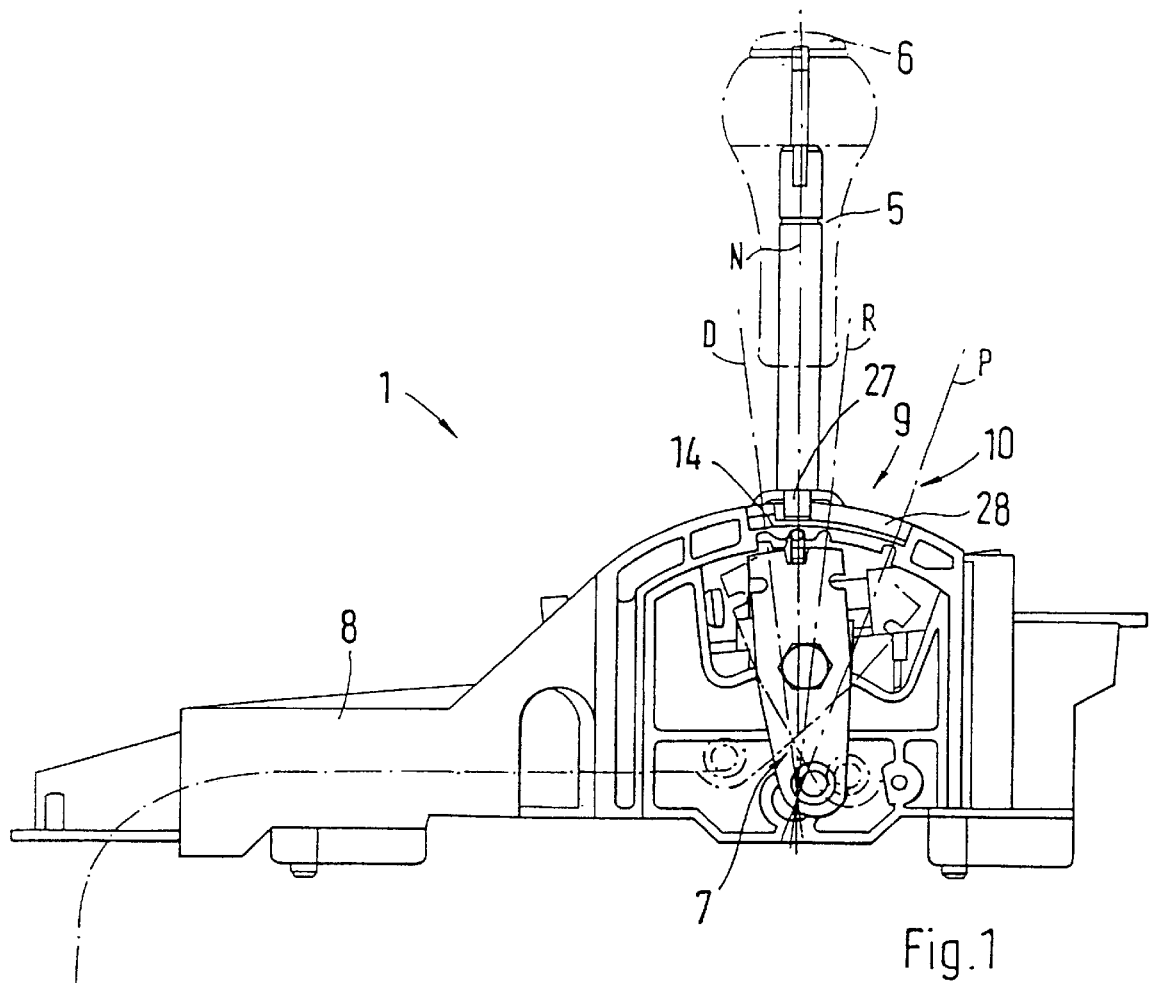
FIG. 1 is an overall diagram of a selection device which is connected to an automatic gearbox, constructed according to a preferred embodiment of the present invention.

The general view given in FIG. 1 shows a selection device 1 which is connected to a control slide 3 of an automatic gearbox 4 by a Bowden cable 2 acting as a transmission line. The selection device 1 comprises a selector lever 5, which has a push button 6, a transmission member 7, which is connected to the Bowden cable 2, a housing 8, a locking device 9 and a longitudinal locking assembly 10. An indented guide slot 11 is formed in the housing 8 and is part of both the locking device 9 and the longitudinal locking assembly 10.

Figure 2:
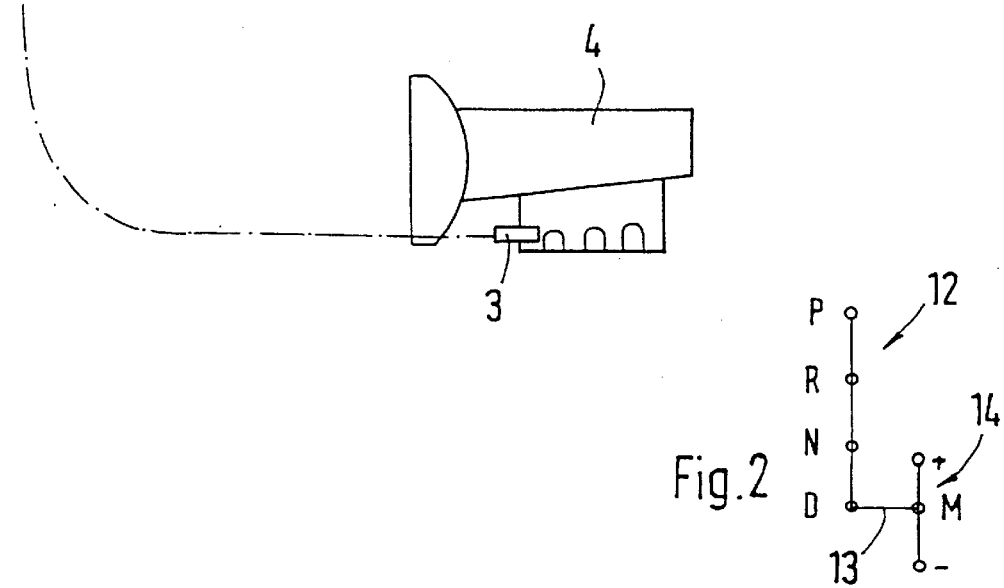
FIG. 2 is a gear-shift diagram of a selector lever in the selection device according to FIG. 1.

As shown in the gear-shift diagram shown in FIG. 2, the selector lever 5 is movable. A first gear-shift gate 12 has the positions P, R, N and D, as known in a conventional manner for the automatic operation of the automatic gearbox 4. As long as the longitudinal locking assembly 10 is not unlocked by pressing the push button 6, the selector lever 5 is held firmly in those positions in the first gear-shift gate 12 by the longitudinal locking assembly 10 which cooperates with the indented guide slot 11; in the illustration according to FIG. 1 the selector lever 5 is in position N. The selector lever can be pivoted by way of a transverse gate 13 into the second gear-shift gate 14 which is arranged parallel to the first gear-shift gate 12. In the second gear-shift gate 14 the selector lever 5 occupies a neutral position M under the action of a spring and can be moved out of the said position M by longitudinal pivoting inside the second gear-shift gate 14 into a position "+" or in the opposite direction into a position "−". When the selector lever 5 reaches the position "+" a shift up in the automatic gearbox 4 is initiated; when the position "−" is reached a shift down is initiated.

Figure 3:
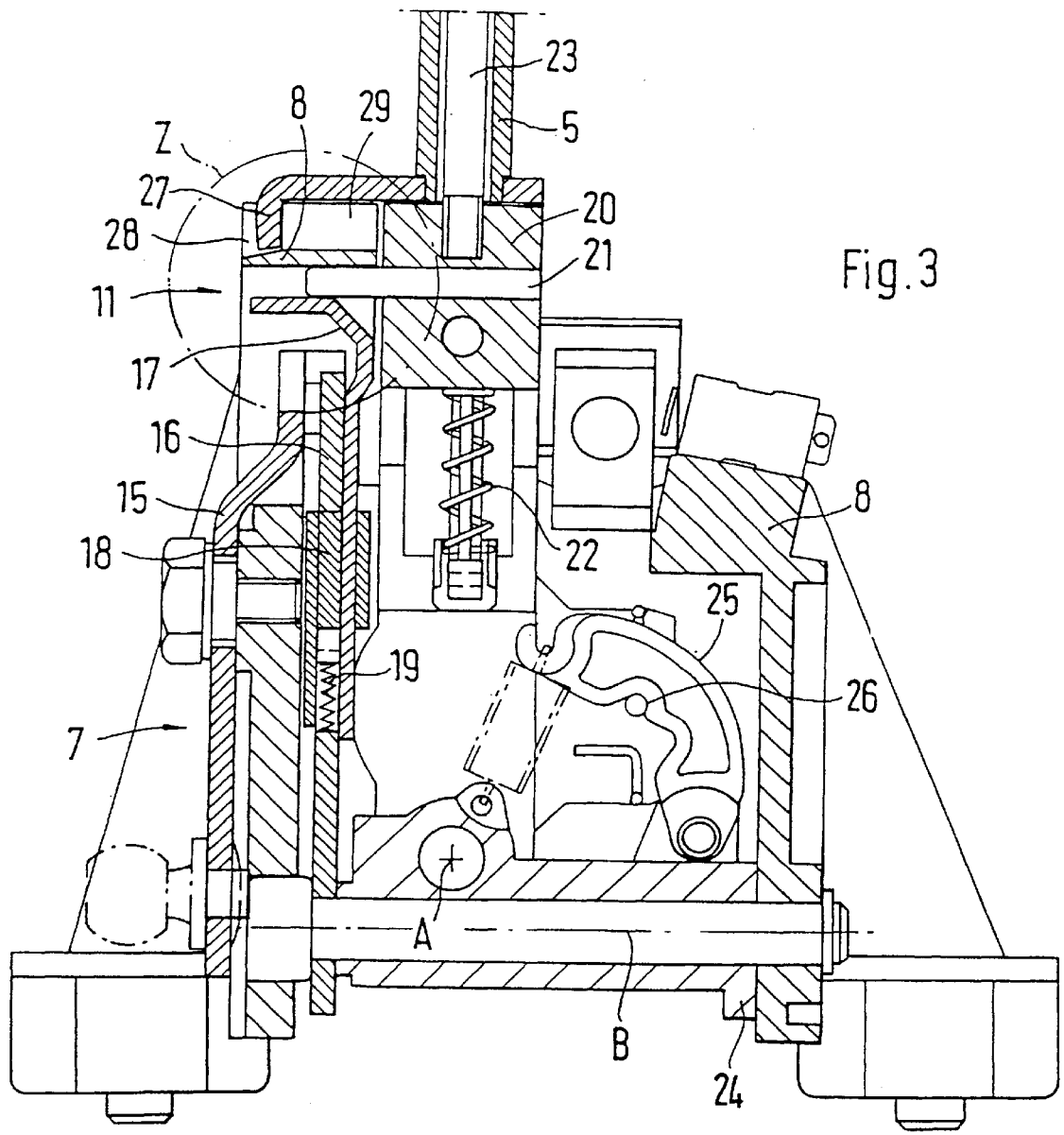
FIG. 3 is a section through the selection device of FIG. 1.

It is evident from the section according to FIG. 3 that the transmission member 7 comprises a first lever 15, a second lever 16 and a slide 17. The levers 15, 16 are mounted pivotably and are linked together. The slide 17 is held by a guide 18 on the second lever 16 and is held there prestressed by a spring 19 in the direction of the indented guide slot 11. A further slide 20, which has a pin 21, is provided on the selector lever 5 which is pivotable transversely to the first gear-shift gate 12 about the shaft A. The slide 17 is held by a spring 22 in its rest position illustrated. A thrust rod 23 connects the push button 6 to the slide 17.

The shaft A is formed in an intermediate member which in turn is mounted in the housing 8 by a shaft B which extends at right angles to the shaft A. The shaft B allows the selector lever 5 to be pivoted in the longitudinal direction of the first gear-shift gate 12 and the second gear shift gate 14. A spring-loaded catch member 25 cooperates with a pin 26 mounted on the selector lever 5, in such a way that the selector lever 5 occupies either a position in the first gear-shift gate 12 or a position in the second gear-shift gate 14 during movement along the transverse gate 13 without occupying intermediate positions. A guide finger 27 arranged on the selector lever 5 above the slide 20 engages in a groove 28 which is formed in the housing. In this way, the selector lever 5 is guided in the first gear-shift gate 12. At the level of the transverse gate 13 the groove 28 opens out to form a transverse groove 29, so that the selector lever 5 can now move along the transverse gate 13. The guide finger 27 is guided with slight play both in the groove 28 and in the transverse groove 29.

Figure 4:
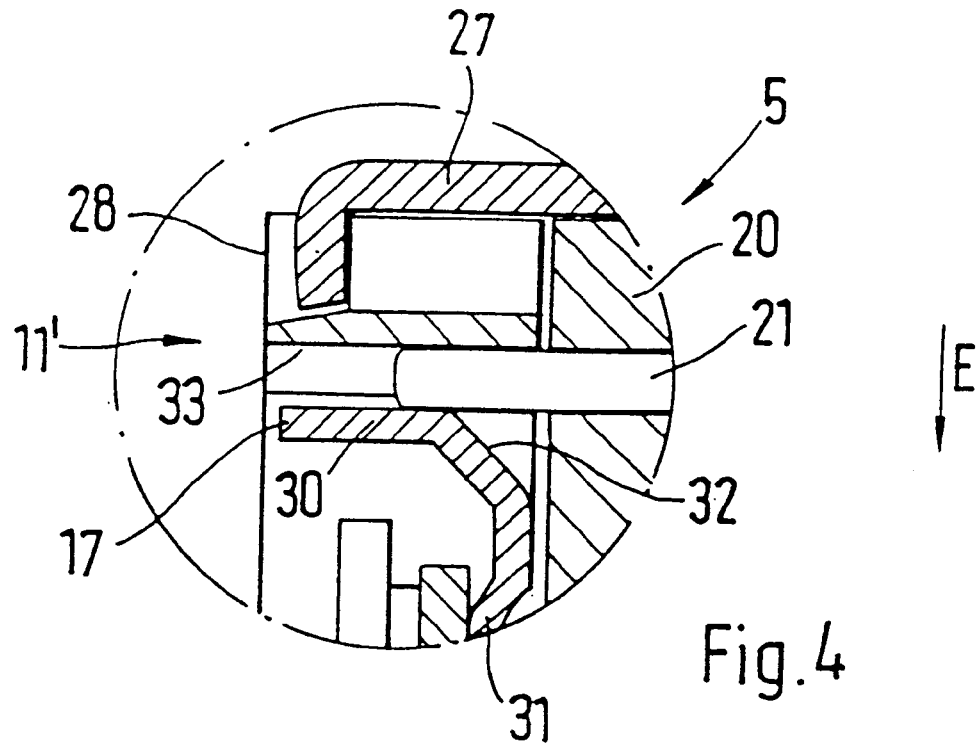
FIG. 4 is a detail Z according to FIG. 3 for a first embodiment.
Figure 5:
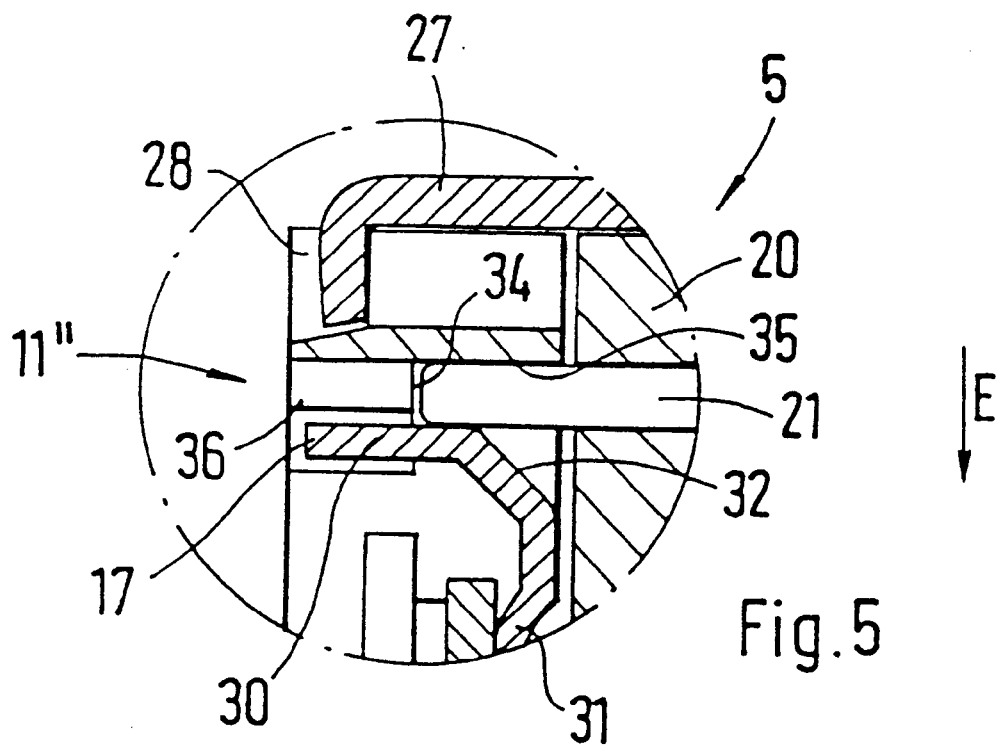
FIG. 5 is a detail Z according to FIG. 3 for a second embodiment.

FIGS. 4 and 5 show two possible embodiments of the locking device 9 as a detail Z of FIG. 3. In both embodiments the slide 17 is constructed in the same way, and the selector lever 5 is situated, displaced by one notch of the indented guide slot 11 with respect to FIG. 1, in the position D at the beginning of the transverse gate 13. At its upper end facing the indented guide slot 11 the slide 17 has an area 30 which is shaped in such a way that it can engage in the indented guide slot 11. In the embodiment shown slide 17 is bent over at a right angle opposite a shaft 31 of the slide 17 for this purpose. A sloping portion 32 is formed between the shaft 31 and the area 30, the sloping portion 32 being adapted to convert a movement of the pin 21 along its longitudinal extension when placed on the sloping portion 32 into a longitudinal movement of the slide 17.

Figure 6:
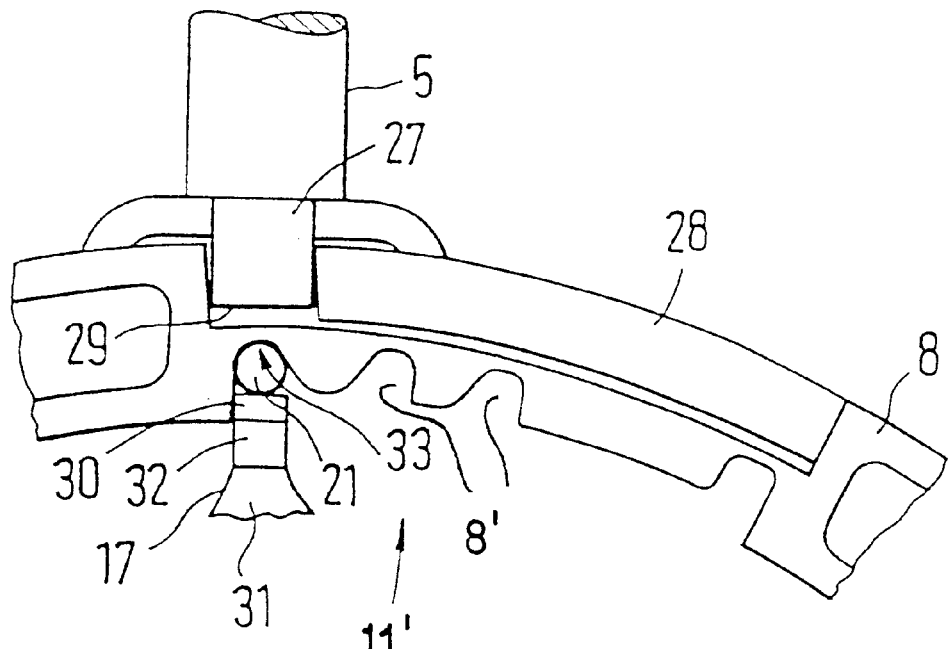
FIG. 6 is a side view to FIG. 4.

With the first embodiment illustrated in FIG. 4 a first indented guide slot 11' is constructed in the same way for the locking device 9 and the longitudinal locking assembly 10. This means that—in the locked state in each case—both the pin 21 and the area 30 rest against a respective continuous base 33 of the indented guide slot 11' (cf. the side view according to FIG. 6). When the selector lever 5 is pivoted to the right out of the illustrated position in the first gear-shift gate 12 into the second gear-shift gate 14, this movement causes the pin 21 to be pulled out of the tooth base 33. The area 30 of the slide 17 can now no longer be supported on the pin 21 and it is pushed into the tooth base 33 by the spring 22. Since the area 30 of the slide 17 is not connected with positive locking to the indented guide slot 11', the slide 17 and therefore also the transmission member 7 can no longer be pivoted. During the opposite movement of the selector lever 5, i.e. when it is pivoted out of the second gearshift gate 14 into the first gear-shift gate 12, the pin 21 first encounters the sloping portion 32 of the slide 17 when it enters the tooth portion 8'. Because of the force acting upon the sloping portion 32 in this case, the slide 17 is moved out of the tooth base 33 against the force of the spring 19, so that the pin 18 can enter the tooth base 33. The area 30 of the slide 17 is now supported again on the pin 21, and the slide 17 and thus the transmission member 7 are no longer in engagement with the indented guide slot 11'. As soon as the selector lever 5 is unlocked by pressure upon the push button 6, the transmission member 7 can now be pivoted freely together with the selector lever 5 with which it is coupled in the first gear-shift gate 12 in a manner not shown.

Figure 7:
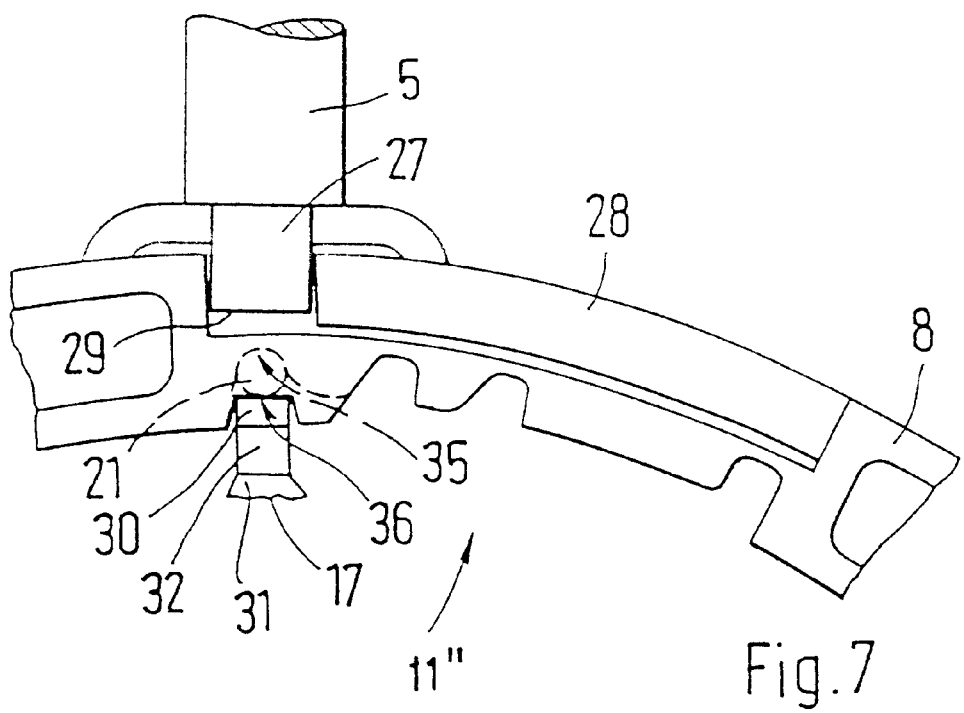
FIG. 7 is a side view to FIG. 5.

In the second embodiment according to FIGS. 5 and 7, a second indented guide slot 11" is constructed in such a way that it has a step 34 which is situated between a first tooth base 35 and a second tooth base 36. The first tooth base 35 is provided for receiving the pin 21, whereas the second tooth base 36 receives the area 30 of the slide 17. In this case the height of the step 34 is dimensioned in such a way that it corresponds substantially to the diameter of the pin 21 or is slightly smaller. The area 30 of the slide 17 always engages therefore in the second tooth base 36 of the indented guide slot 11", and the slide 17 is always prevented from pivoting. This applies irrespectively of whether the selector lever 5 is in the first gear-shift gate 12 or in the second gear-shift gate 14, and therefore also irrespectively of whether the pin 21 engages in the first tooth base 35 or not. The slide 17 is now displaced against the force of the spring 16 only when the slide 17 of the selector lever 5 is moved in the unlocking direction E by actuation of the push button 6. In this case the pin 21 rests against the area 30 of the slide 17, moves the slide 17 in the unlocking direction E against the force of the spring 19 out of the second tooth base 36 and therefore out of the indented guide slot 11", so that the transmission member 7 is freely pivotable.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gear shift assembly for a gearbox comprising:

a gearbox housing, a selector lever supported at the housing to be movable in first and second gearshift gates connected by a transverse gate, a transmission member operable to control operation of a transmission between a plurality of driving gears in response to movement of the selector lever in said first gear shift gate, a transmission member locking device securing the transmission member in a predetermined position in said housing when said selector lever is moved out of the first gear shift gate, and a selector lever locking member carried by the selector lever and operable to lock the selector lever in selected transmission gear positions when the selector lever is in said first shift gate, wherein the transmission member locking device and the selector lever locking member are engageable together and actuable in a common locking direction in response to movement of a manually operable control member carried on the selector lever.

2. A gear shift assembly according to claim 1, wherein the transmission member locking device and the selector lever locking member are coupled together at least temporarily during operation of the gear shift assembly.

3. A gear shift assembly according to claim 1, wherein the transmission member locking device and the selector lever locking member are actuated jointly by the control member during operation of the gear shift assembly.

4. A gear shift assembly according to claim 1, wherein the transmission member locking device comprises a slide arranged on a side of the transmission member facing the selector lever, wherein the transmission member performs a pivoting movement during gear shift changes, wherein the slide is movable radially with respect to the transmission member and is engageable in an indented guide slot arranged on the housing, wherein the selector lever locking member is movable radially to the pivoting movement of the selector lever, wherein the selector lever locking member is held in a rest position under action of a spring and is movable by the driver by way of said control member and has a projection which is engageable in the indented guide slot, and wherein the projection acts upon the slide of the transmission member locking device.

5. A gear shift assembly according to claim 4, wherein the projection transmits the movement of the selector lever locking member to the slide.

6. A gear shift assembly according to claim 4, wherein the projection is situated between an indented guide stop and the slide when the selector lever is in the first gear shift gate and the slide is thereby disengageable from the indented guide slot when the selector lever is moved out of the first gear-shift gate.

7. A locking assembly for a gear shift assembly for a gearbox of the type including:

a gearbox housing, a selector lever supported at the housing to be movable in first and second gearshift gates connected by a transverse gate, and a transmission member operable to control operation of a transmission between a plurality of driving gears in response to movement of the selector lever in said first gear shift gate, said locking assembly including:

a transmission member locking device securing the transmission member in a predetermined position in said housing when said selector lever is moved out of the first gear shift gate, and a selector lever locking member carried by the selector lever and operable to lock the selector lever in selected transmission gear positions when the selector lever is in said first shift gate, wherein the transmission member locking device and the selector lever locking member are engageable together and actuable in a common locking direction in response to movement of a manually operable control member carried on the selector lever.

8. A locking assembly according to claim 7, wherein the transmission member locking device and the selector lever locking member are coupled together at least temporarily during operation of the gear shift assembly.

9. A locking assembly according to claim 7, wherein the transmission member locking device and the selector lever locking member are actuated jointly by the control member during operation of the gear shift assembly.

10. A locking assembly according to claim 7, wherein the transmission member locking device comprises a slide arranged on a side of the transmission member facing the selector lever, wherein the transmission member performs a pivoting movement during gear shift changes, wherein the slide is movable radially with respect to the transmission member and is engageable in an indented guide slot arranged on the housing, wherein the selector lever locking member is movable radially to the pivoting movement of the selector lever, wherein the selector lever locking member is held in a rest position under action of a spring and is movable by the driver by way of said control member and has a projection which is engageable in the indented guide slot, and wherein the projection acts upon the slide of the transmission member locking device.

11. A locking assembly according to claim 10, wherein the projection transmits the movement of the selector lever locking member to the slide.

12. A locking assembly according to claim 10, wherein the projection is situated between an indented guide stop and the slide when the selector lever is in the first gear shift gate and the slide is thereby disengageable from the indented guide slot when the selector lever is moved out of the first gear-shift gate.

* * * * *